Nov. 1, 1932.  C. W. HOTTMAN, JR  1,885,827
HOIST CLUTCH CONTROL MECHANISM
Filed Jan. 30, 1929  2 Sheets-Sheet 1
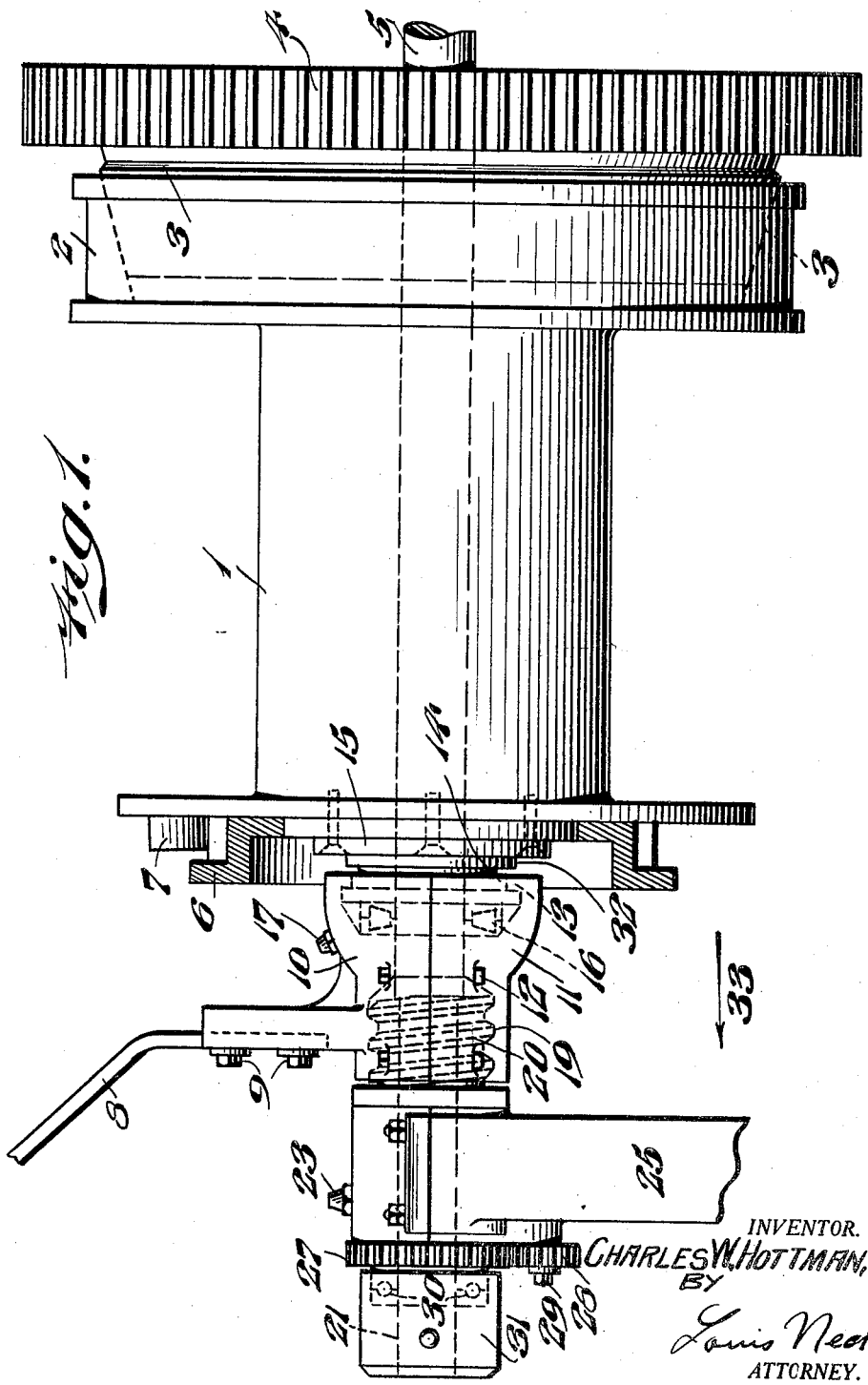
INVENTOR.
CHARLES W. HOTTMAN, JR.
BY
Louis Necho
ATTORNEY.

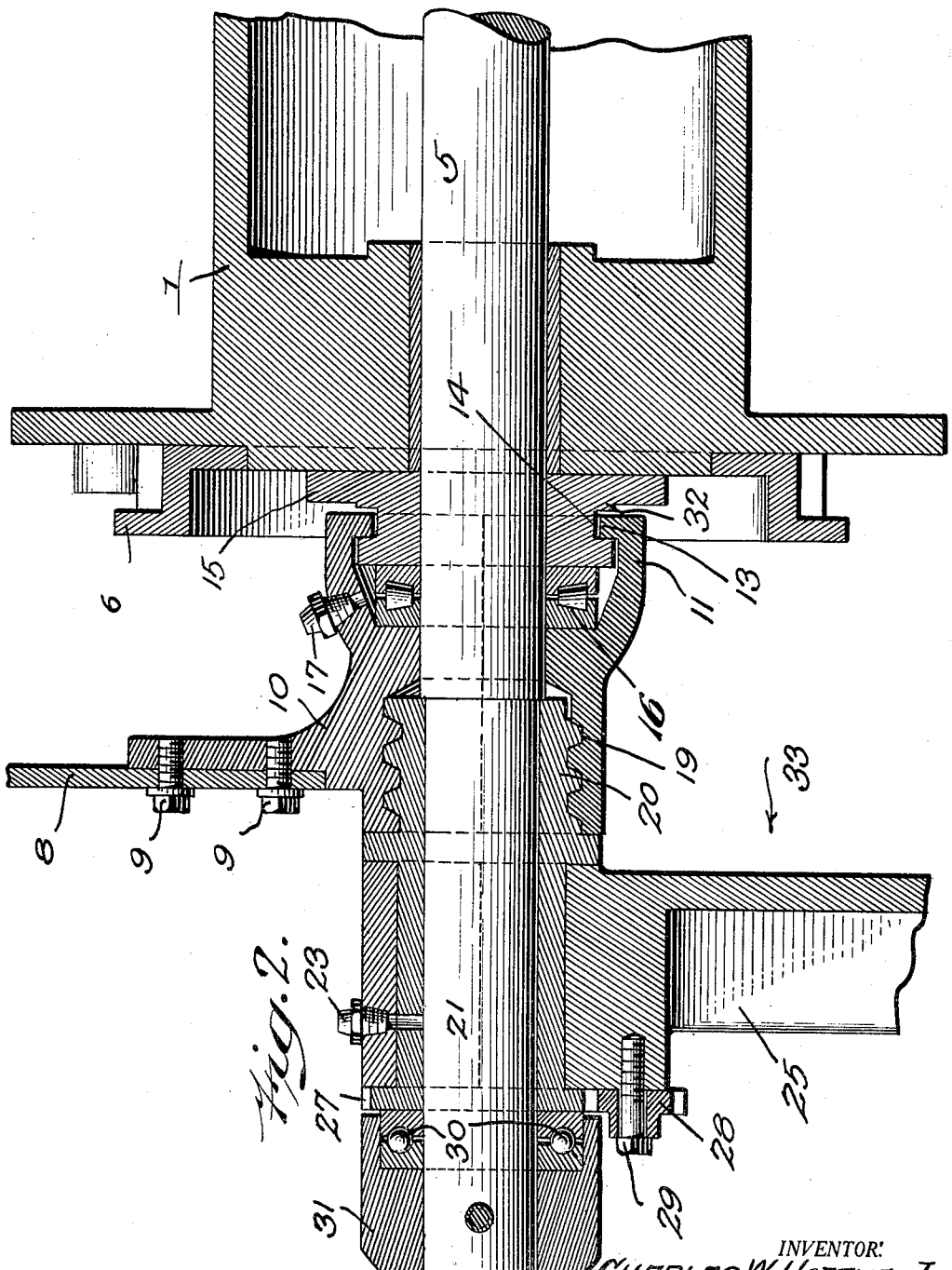

Patented Nov. 1, 1932

1,885,827

UNITED STATES PATENT OFFICE

CHARLES W. HOTTMAN, JR., OF SANDUSKY, OHIO, ASSIGNOR TO THE BROWN CLUTCH COMPANY, OF SANDUSKY, OHIO, A CORPORATION OF OHIO

HOIST CLUTCH CONTROL MECHANISM

Application filed January 30, 1929. Serial No. 336,274.

My invention relates to a novel construction of a hoist clutch control mechanism for engaging and disengaging a cone-clutch mechanism, the complementary male and female parts of which are carried by a driving element and by a hoisting drum respectively, whereby I am enabled to bring the hoisting drum into operative lifting or lowering position without in any way manipulating, moving or controlling the driving element and whereby I am enabled to disengage and render said hoisting drum stationary without stopping the rotation of said driving element.

My invention further relates to a novel construction which includes a sectional operating nut which can be assembled over the supporting structure, said operating nut being provided with a positive pull back flange and forming a dust proof enclosure.

My invention further relates to a novel construction of an operating nut co-acting with a thrust screw for engaging and disengaging the conical male and female members of a clutch and means for adjusting said thrust screw with respect to said operating nut to take up the play resulting from wear and tear on the parts.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

My invention further relates to various other novel features of construction and advantage all as hereinafter described and claimed in connection with the accompanying drawings, in which:—

Fig. 1 represents a view partly in side elevation and partly in section showing a hoist control mechanism embodying my invention.

Fig. 2 represents a fragmentary longitudinal sectional view of the left hand portion of Fig. 1.

Referring to the drawings in which like reference characters indicate like parts, 1 designates a hoisting drum which is provided at one end thereof with a female member 2 of a cone-clutch, the male member 3 of which is revolved by the gear 4 on the shaft 5 driven by any source of power not shown. At the other end of the hoisting drum 1 is a cog-wheel or gear 6 which is adapted to be engaged by a pawl 7 to prevent back turning or unwinding of the hoist drum 1 when the latter is in its disengaged position. 8 designates a lever which is secured at 9 to the upper half 10 of a sectional operating sleeve nut, the lower half 11 of which is secured to said upper half by the bolts 12. (See Fig. 1). The operating nut formed of the upper and lower halves 10 and 11 is provided with the anular inwardly turned flange 13 which is adapted to engage a seat or recess 14 in the thrust head or plate 15 which is suitably secured to or carried by the front end of the drum 1. 16 designates suitable anti-friction bearings which are lubricated by removal of the plug 17. The operating nut 10—11 is provided with a rear threaded portion 19 which is adapted to engage a correspondingly threaded thrust screw 20. The thrust screw 20 is provided with suitable bearings and is mounted on the shaft 21 which abuts at its forward end against the juxtaposed end of the shaft 5 on which the drum 1 is mounted and which is of a slightly larger diameter than the shaft 21 as will be seen from Fig. 2. 23 designates a plug which may be removed for purposes of lubricating the bearings of the thrust screw 20. 25 designates a frame which supports the shaft 21 and its adjuncts. 27 designates an adjusting gear carried by the thrust screw 20, said adjusting gear being rigidly maintained in any adjusted positon by the pinion 28 which is fastened rigidly to the frame 25 by the screw 29. 30 designates suitable anti-friction bearings for the thrust collar 31 on the rear end of the shaft 21. The operation is as follows: Assuming the parts to be as shown in Fig. 1, that is, assuming that the male and female members 2 and 3 of the conical clutch at the right hand side of the drum to be engaged, the drum 1 will be in its operative winding or hoisting position. If it is desired to disengage the conical clutch members 2 and 3 to render the drum 1 inoperative, it is merely necessary to turn the handle or lever 8 to the left or against the direction of the threading of the thrust screw 20. This results in the sectional operating nut moving away from the drum 1 in the direction of the arrow 33, whereupon the flange 13 of the operating nut 10—11, engaging the annular recess 14 in the thrust head 15 at the front end of the drum 1, will pull the drum 1 away from the driving gear 4 to disengage the female conical member 2 from the male conical member 3. In this position of the parts the male conical member 3 may continue to revolve, if desired, but it will not affect or revolve the drum 1 which is prevented from turning back or unwinding under load by a pawl 7 engaging the cog-wheel 5. If it is desired to render the drum 1 operative, it is merely necessary to turn the handle or lever 8 in the opposite arcuate direction and due to the threaded engagement of the operating nut 10—11 with the thrust screw 20, this will result in moving the operating nut towards the drum 1, so that the annular flange 13 of said operating nut will bear against the shoulder 32 of the thrust head or plate 15, thereby pushing the drum 1 towards the driving gear 4 to engage the female member 2 carried by the drum 1 with the revolving male member 3 thereby revolving the drum 1.

Due to the wearing out of the male and female clutch members 2 and 3 it becomes necessary to provide means for adjusting the parts to take up the resultant play and to that end I provide the adjustment gear 27 carried by the rear end of the thrust screw 20. Thus by turning the gear 27 I vary the position of the threads on the thrust screw 20 with relation to the threaded operating nut 10—11, thereby also varying the resultant lateral movement of the operating nut 10—11 which takes place when the lever 8 has been turned. In other words, since the lateral travel or movement of the operating nut 10—11 towards or away from the drum 1 is produced by the turning of said nut upon said thrust screw by the movement of the lever 8 through a fixed arcuate distance, it follows that any alteration of the position of the threads on the screw 20, with relation to the threads on the operating nut 10—11, will also alter the resultant lateral travel or movement of the operating nut. Thus a right hand turn of the thrust screw 20 will "advance" the position of the operating nut 10—11 in the direction of the drum 1 so that when the lever 8 has been moved through its fixed arcuate distance the nut 10—11 has a greater net movement towards the drum 1 than it would have had prior to the turning of the thrust screw 20. In this way I am enabled to take up the play which results from the wearing out of the conical male and female clutch members 2 and 3.

It will thus be seen that the gear 27 is merely a tool for the purpose of turning the thrust screw 20 without the necessity of dismantling the parts, and in order rigidly to retain the thrust screw 20 in any position to which it has been adjusted, also without dismantling the parts, I provide the pinion 28 which "locks" the gear 27 in position and which is rigidly secured to the frame 25 by the bolt or screw 29. When it is desired to adjust the thrust screw 20 by turning the gear 27, it is first necessary to loosen the pinion 28 whereupon the gear 27 may be turned. When the pinion 28 has been loosened and the gear 27 has been turned to the desired position, the pinion 28 is placed in position in mesh with the gear 27 and is rigidly retained by the bolt screw 29 thus locking the gear 27 in fixed position.

Having thus described my invention what I claim as new and desire to secure by Letters Patent, is:—

1. A hoist clutch control mechanism comprising a thrust screw, a threaded operating nut engaging said screw, means for rotating said operating nut about said screw through a fixed arcuate distance, and means for adjusting and for retaining said thrust screw in any desired position, including a gear carried by said thrust screw and a pinion adapted to engage said gear.

2. A clutch control mechanism comprising a supporting frame, a thrust screw, a bearing therefor, a threaded operating nut engaging said screw, means for rotating said operating nut about said thrust screw, and means for adjusting and for retaining said thrust screw, including interlocking devices carried by said bearing and said frame.

3. A clutch control mechanism comprising a supporting frame, a thrust screw, a bearing therefor, a threaded operating nut engaging said screw, means for rotating said operating nut about said thrust screw, and means for adjusting and for retaining said thrust screw, including a gear carried by said bearing and a pinion carried by said frame and adapted to engage said gear.

CHARLES W. HOTTMAN, Jr.